Sept. 24, 1957 J. S. BECK 2,807,440
DIRECTIONAL WINDOW CUTTER FOR WHIPSTOCKS
Filed Aug. 10, 1953 2 Sheets-Sheet 1
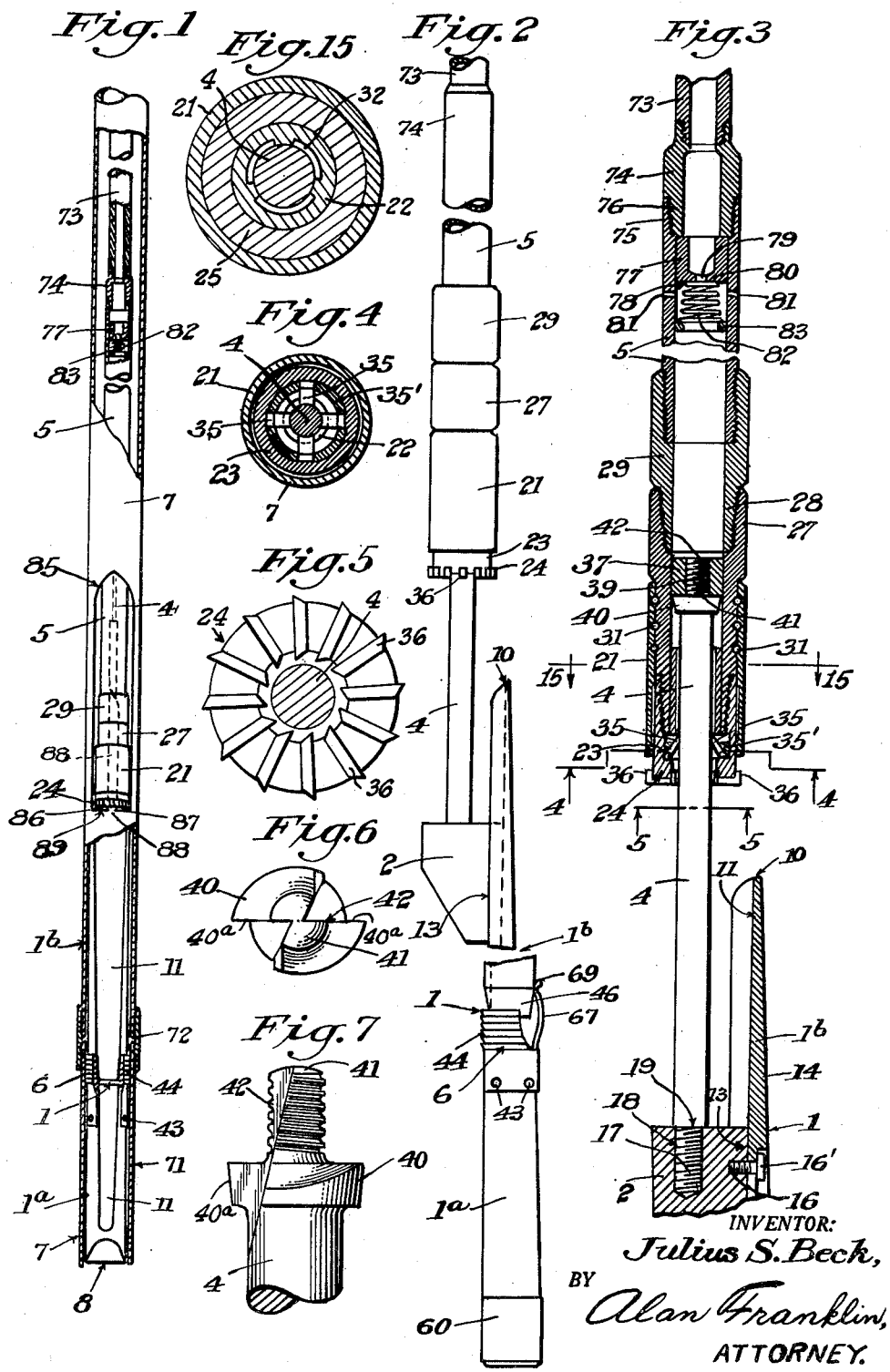
INVENTOR:
Julius S. Beck,
BY Alan Franklin,
ATTORNEY.

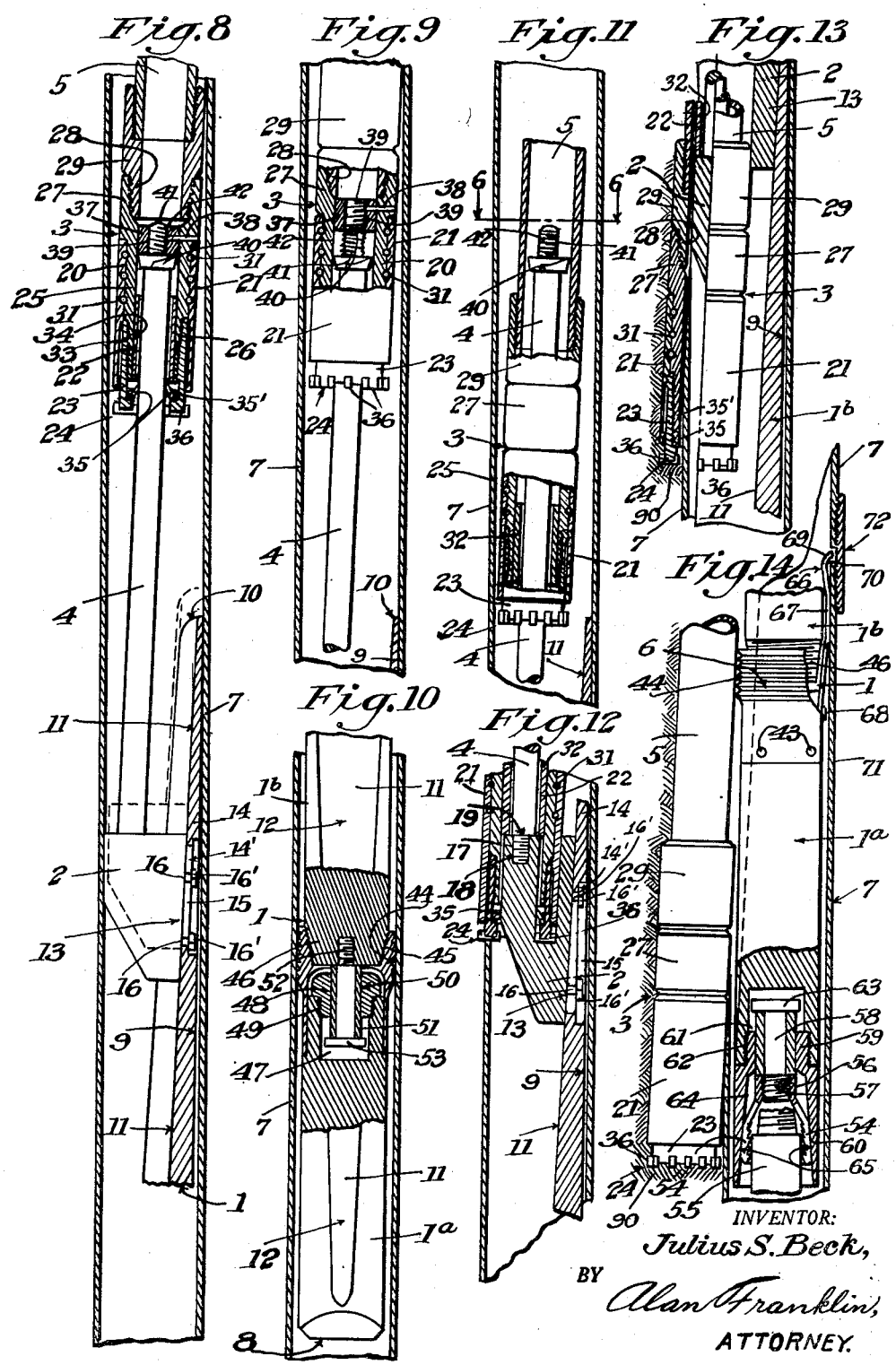

United States Patent Office 2,807,440
Patented Sept. 24, 1957

2,807,440

DIRECTIONAL WINDOW CUTTER FOR WHIPSTOCKS

Julius S. Beck, Long Beach, Calif., assignor to J. E. Hill, Fort Worth, Tex.

Application August 10, 1953, Serial No. 373,116

3 Claims. (Cl. 255—1.6)

This invention relates to oil-well drilling tools, and more particularly to a directional window cutter for oil well casing.

The general object of my invention is to provide an improved oil-well milling and side tracking tool.

Heretofore it was very difficult and expensive to guide a cutter in a well casing, or in cutting a window in said casing or in rock formations of wells.

A further object of my invention is to provide a positive and inexpensive means for guiding a cutter in a well casing or for cutting a "window" in said casing or in rock formations in wells.

A more particular object of my invention is to provide a control means for directing a casing cutter at an outward inclination away from a whipstock body at a predetermined angle, whereby shear pins are eliminated.

Other objects and advantages of my invention will appear hereinafter as this specification progresses.

The invention is illustrated in the annexed drawings, forming a part of this specification, in which:

Fig. 1 is a vertical longitudinal section of my invention shown in a well casing partly broken away to show certain construction.

Fig. 2 is an elevation of my invention shown partly broken away.

Fig. 3 is a fragmentary longitudinal section of my invention on an enlarged scale.

Fig. 4 is a horizontal section of my invention taken on line 4—4 of Fig. 3.

Fig. 5 is an enlarged horizontal section of my invention taken on line 5—5 of Fig. 3.

Fig. 6 is a top plan view of the mandrel of my invention on an enlarged scale.

Fig. 7 is an elevation of the upper end portion of the mandrel of my invention as shown in Fig. 6.

Fig. 8 is a fragmentary longitudinal section of my invention on an enlarged scale, shown in a well casing in position about to begin cutting a window in the casing; the dash lines show the position of the mandrel supporting stabilizer prior to setting the whipstock.

Fig. 9 is a fragmentary longitudinal section, partly in elevation, of the upper portion of my invention in a well casing, on an enlarged scale, showing the upper end of the mandrel unthreaded from the frangible collar, to enable the mandrel to cut away said collar, as my invention is rotated to begin cutting a window in said casing.

Fig. 10 is a fragmentary longitudinal section of the lower end portion of my invention in a well casing, on an enlarged scale, showing the lower and upper members of the whipstock interengaged and the whipstock gripped in the casing by its slips.

Fig. 11 is a fragmentary elevation longitudinal section of my invention in a well casing, on an enlarged scale, showing the rotary cutter of my invention about to begin cutting a window in the casing.

Fig. 12 is a fragmentary longitudinal section of my invention in a well casing on an enlarged scale, showing the rotary cutter of my invention in the act of cutting a window in said casing and cutting out the stabilizer of the whipstock.

Fig. 13 is a fragmentary longitudinal section of the upper portion of my invention shown in a well casing, on an enlarged scale, showing the rotary cutter of my invention in the act of cutting a window in said casing, and showing my invention guided nearly half way through said window by the whipstock of my invention.

Fig. 14 is a fragmentary longitudinal section of my invention in a well casing on an enlarged scale, showing the lower end portion of my invention gripped in said casing by the whipstock thereof, and the "fish" gripper on the lower end of said whipstock gripping a "fish" in the lower end of the well, to prevent my invention from turning in said casing and showing the upper portion of my invention with my rotary cutter having cut a window in said casing and my invention having been guided out of the casing completely through said window, by said whipstock.

Fig. 15 is an enlarged section taken on line 15—15 of Fig. 3.

Referring more particularly to the annexed drawing, in which the same parts are designated by the same reference numerals in all of the figures, my invention includes generally a whipstock body member 1 comprising a lower member 1ª and an upper member 1ᵇ; a stabilizer 2; a chambered sub-member 3; a directional mandrel 4 connected at its lower end to said stabilizer 2 and slidable at its upper end in said sub-member 3; a tubular container 5 connected at its lower end to the upper end of said sub-member 3; and slips 6 secured on the upper end of said lower member 1ª of said whipstock body member 1.

The lower member 1ª of the whipstock body member 1 is substantially cylindrical and of such diameter as to slidably fit in a well hole or well casing 7, and from the lower end 8 of said lower member 1ª of said whipstock body member 1 at the inner side thereof, said body member is inclined towards its outer cylindrical side 9 to the upper end 10 of the member 1ᵇ of said body member 1, forming an inner inclined guiding surface 11, which is concaved transversely thereof as indicated at 12. In said guiding surface 11 of said body member 1 is slidably fitted on one side 13 of said stabilizer 2. The wall 14 of the whipstock upper member 1ᵇ between said inclined guiding surface 11 and the cylindrical outer side 9 of said whipstock body member is reduced in thickness as indicated 14′ for a suitable length, with the inner side thereof conforming with the inner guiding surface 11 of the whipstock body member 1. Said thin wall 14′ is provided with a longitudinal slot 15 through which are extended two bolts 16 which are threaded in the side 13 of the stabilizer 2, while the heads 16′ of said bolts engage the outer side of said thin wall section 14′, whereby said side 13 of the stabilizer 2 is drawn by said bolts 16 to the guiding surface 11 of the whipstock body member 1, whereby said stabilizer 2 is held tightly in a sliding engagement with said guiding surface 11 of said body member 1.

The lower end 17 of the directional control mandrel 4 is reduced and threaded to thread into a threaded socket 18 in the upper end of the stabilizer 2 until a shoulder 19 between the lower end of said mandrel and the upper end of said lower threaded reduced end 17 of said mandrel engages the upper end of the stabilizer 2.

The sub-member 3, into which, from the lower end thereof, extends the upper end portion of the directional mandrel 4, comprises a female coupling member 20, an outer control sleeve 21, an inner control sleeve 22, a tubular mill body 23, and a conventional milling cutter 24 on the lower end of said mill body. The female coupling member 20 comprises a cylindrical sleeve body 25, which is formed on its lower end with a lower tapered externally threaded end extension 26 and an internally threaded box coupling member 27 formed on the upper end of said sleeve body 25 into which box coupling member 27 is threaded an externally threaded pin 28, formed on the lower end of a male coupling member 29, into the upper end of which coupling member is threaded the lower end of the tubular container 5. The outer control sleeve 21 is rotatably mounted on said cylindrical sleeve body 25 of said female coupling member 20, by means of ball bearings 31. The inner control sleeve 22 is tightly and slidably fitted in the lower end portion of said cylindrical sleeve body 25 of said female coupling member 20, but the inner diameter of said inner control sleeve 22 is slightly larger than the diameter of the directional control mandrel 4, and includes longitudinal flutes 32 therein for fluid passage. The tubular mill body 23 is located within the lower end portion of the outer control sleeve 21 and is internally threaded in its upper end portion, as indicated at 33, for engaging the external thread 34 on the lower end extension 26 of the cylindrical sleeve body 25 of the female coupling member 20. Dogs 35 are pivoted to and within a ring 35' turnably mounted in the lower end of the tubular mill body 23 for engaging the mandrel 4 for holding said mandrel and the stabilizer 2 against slipping downward with relation to the sub-member 3. The milling cutter 24 comprises a plurality of radial cutter blades 36, which blades 36 extend radially outwardly beyond the outer diameter of the tubular mill body 23 and inwardly to a point outside of the mandrel 4, the cutting edges of which blades are along the bottom horizontal and outer vertical edges thereof. In the upper end of the sleeve body 25 of the female coupling member 20, below the box coupling member 27, is secured a frangible collar 37 of soft metal, such as aluminum, by means of a pin 38 driven radially through said box coupling member 27 and through said collar 37, which collar is provided with an internal left hand thread 39. On the upper end of the directional control mandrel 4 is formed a cutter head 40, from which extends upwardly an axial threaded stud 41 formed with a left hand thread 42 for engaging the left hand thread 39 in the collar 37 in the manner and for the purpose hereinafter more fully described. As shown in Figs. 6 and 7, the diagonal cutting edges 40ª of the cutter head 40 extend through the sides of the stud 41 and the stud threads 42.

The slips 6 are secured to the upper end of the whipstock lower member 1ª at their lower ends by screws 43, and said slips are expansible at their upper end portions and are formed with external teeth 44 and internal teeth 45 at their said upper expansible end portions. The external teeth 44 are adapted to engage the inner surface of the well casing 7, while the internal teeth 45 of said slips 6 are adapted to engage the lower conical end 46 of the upper member 1ᵇ of the whipstock body 1.

In the upper end of the lower member 1ª is formed a socket 47 in the upper end of which a plug 48 is threaded at 49, which plug is provided with an axial bore 50 through which slidably extends a short slidable mandrel 51 which is formed at its upper end with a threaded stud 52 threaded into the lower conical end 46 of the upper member 1ᵇ of the whipstock body 1, while the lower end of said mandrel 51 extends downwardly from the lower end of the plug 48 into the socket 47 and a head 53 is formed on the lower end of said mandrel for engaging the lower side of said plug 48 on the upward movement of the upper member 1ᵇ of the whipstock body 1, whereby the lower member 1ª of said whipstock body 1 is caused to be drawn upwardly with said upper member 1ᵇ of said whipstock body upon upward movement of said upper member.

In Fig. 14 of the drawing fish gripping slips 54 are mounted in the lower end of the lower member 1ª of the whipstock body 1, for gripping a "fish" 55 in the bottom of an oil well, when my invention is lowered into the well, to prevent turning of my invention in the well casing, while my directional milling cutter 24 cuts a "window" in one side of the well casing 7 for side tracking a well drill past said fish. The slips 54 are formed with an internally threaded collar 56 at their upper ends, which collar is threaded on a threaded stud 57 depending from the lower end of a short slidable mandrel 58 which is slidable axially through a bearing 59 formed on the upper end of a bull-dog fish socket 60, which bearing is externally threaded in an internally-threaded socket 61 at 62 in the lower end of the lower member 1ª of the whipstock body 1. On the upper end of the mandrel 58 is formed a head 63 for engaging the upper end of the bearing 59 for limiting the downward movement of said mandrel in said bearing and preventing the slips 54 from dropping out of the bottom of the fish socket 60 when the lower end of the lower member 1ª of the whipstock body 1 is raised above the fish 55. The bull-dog fish socket 60 is formed with an internal conical bore 64, the surface of which engages the external surface 65 of the slips 54, when said socket 60 is lowered over said slips, for contracting said slips into gripping engagement with the "fish" 55 for holding the whipstock body 1 against turning in the casing 7 as the milling cutter 24 is rotated by the drill pipe 73 and the tubular container 5, through the pin and box coupling 28 and 27, for cutting a window in the casing 7 in the manner hereinafter more fully described.

A casing collar-joint locater 66 is secured on the whipstock body 1 for locating said whipstock body in a suitable casing section, which locater comprises a flat spring 67, secured at its lower end to the upper end of the lower member 1ª of the whipstock body 1, as indicated at 68, while the upper end of said spring is bent outwardly into hook form, as indicated at 69, for detachably engaging the upper end 70 of a suitable section 71 of the casing 7 in a casing collar joint 72 connecting said section 71 with the next section above, for supporting the whipstock in said casing section 7.

The upper end of the tubular container 5 is coupled to the lower end of a drill pipe 73 by a conventional sub 74, the upper end of said tubular container being formed with a "box" 75 in its upper end to receive a "pin" 76 on the lower end of said sub 74.

In the upper end of said tubular container 5, immediately below the coupling "box" 75, is slidably fitted a cup-shaped plunger 77 of a circulation valve 78, which comprises said plunger 77 provided with irrelatively small inlet port 79 in the bottom wall 80 thereof, a plurality of ports 81 extending through the side wall of said tubular container 5 below said valve plunger 77 when in its uppermost position, and a coil spring 82 interposed between a base ring 83, secured in said container 5, and the lower end wall 80 of said valve plunger 77, which spring 82 normally maintains said valve plunger 77 in its uppermost position, with its upper end engaging the lower end of the sub "pin" 76, the bore of which pin is smaller in diameter than the external diameter of said valve plunger 77, and with the lower end of said plunger raised above and uncovering said ports 81 in the tubular container wall, as shown in Fig. 3 of the drawings.

The operation of my invention is as follows:

My whipstock side-tracking tool being connected at its upper end, by the sub 74, to the lower end of the drill pipe 73, said drill pipe and my tool are lowered in the well casing 7 to a desired depth as shown in Figs. 8 and 9 of the drawings, by the draw works above on the floor of the oil-well derrick, until the upper hook end 69 of the joint collar locater 66 contacts the upper ends of an adjacent section 71 of the casing 7, which end of said casing section is joined by a collar 72, thus locating a collar joint in the casing 7 near the depth of the well where it is desired to locate my tool in a position away from a collar joint. As the drill pipe 73 is lowered, the fluid in the well will enter the ports 81 and move upwardly through the inlet port 79 and into the drill pipe 73 where the fluid will reach its static level. Circulation from the slush pump (not shown) above the earth's surface is then started and fluid moves downwardly through the drill pipe 73 and causes the valve plunger 77 to move downwardly and close ports 81. The fluid then passes through the restricted port in the plunger 77, through the mutilated threads 42 on the cutter head 40, to the milling cutter 24 for returning cuttings to the earth's surface in the manner of rotary drilling. When circulation is stopped, the spring 82 returns the plunger 77 to its upward position, opening ports 81 for draining or bleeding the drill pipe 73 when raising the drill pipe out of the hole. After locating said collar joint my tool is further lowered in the well, the hook 69 of the collar locater 66 escaping the upper end of said casing section 71, until the slips 54 in the lower end of the lower whipstock member 1ª slip over the upper end of the "fish" 55, while the lowering movement of the bull dog fish socket 64 causes the internal conical surface 64 of the wall of said socket to engage the outer surface of the slips 54 and contract said slips into gripping engagement with said fish, whereby the whipstock body 1 and certain other parts of my tool are prevented from being rotated by the drill pipe 73 from the turntable on the floor of the oil well derrick.

The drill pipe 73 is then rotated by the turntable on the floor of the derrick, which pipe, through sub 74, rotates the tubular container 5 coupling member 29, sub member 3, frangible collar 37, outer control sleeve 21, tubular mill body 23, annular milling cutter 24, and inner control sleeve 22. As the drill pipe 73 turns to the right in the usual manner, the left hand threads connecting the frangible collar 37 with the stud 42 part and become mutilated, after which the cutter head completely disintegrates said collar. As the rotary parts of my tool are further lowered in the well casing and the milling cutter 24 is rotated, as above described, the sub-member 3, cutter 24, outer control sleeve 21, mandrel 4, and stabilizer 2, are guided in the casing 7 at an inclination toward the left of the casing by the engagement of the stabilizer surface 13 with the inclined inner surface 11 of the whipstock 1, the stabilizer 2 being guided from its upper position, as shown in Fig. 8 in dotted lines, to its lower position, as shown in full lines in said figure until the outer ends of the radial blades 36 of the rotary cutter 24 begin to cut the upper end of a window 85 in the left side of the well casing 7, as illustrated in Figs. 11, 12 and 1 of the drawings. As the blades 36 of the rotary cutter 24 cut the window 85 downwardly in the letf side of the casing 7, the lower end of the left side of the outer control sleeve 21 engages the left inner side of said casing and wedges against said side of the casing to prevent the mill body 23 from wedging against said side of said casing and binding itself against rotation should the wedging action of said outer control sleeve 21 against said innerside of the casing hold said sleeve against rotation, the mill body 23 and milling cutter 24 will continue to be rotated by the turntable of the well derrick on the ball bearings 31 in said outer control sleeve 21, and the milling cutter 36 will continue to rotate and cut the window 85 downwardly in the left side of the casing 7, as illustrated in Figs. 1 and 12 of the drawings, during which cutting operation the outer side of the milling cutter 24 cuts outwardly through the left wall of the casing 7, and also cuts downwardly through the stibilizer 2, as shown in Fig. 12 of the drawings. The milling cutter 24, continuing its downward rotary cutting operation, after cutting through the stabilizer 2, is still guided outwardly and downwardly at an inclination by the engagement of the remaining inner side 13 of the stabilizer 2 with the inclined surface 11 of the whipstock 1, whereby the outer side of the milling cutter 36 cuts outwardly completely through the left wall of the casing until the interior of said cutter is brought directly into alignment with the casing wall at the lower edge of the window 85 so far cut by said cutter, whereupon the annular cutter blades 36, at diametrically opposite points, around the mandrel 4, cut two diametrically spaced slots 86 and 87 downwardly in the casing from said lower edge of the window 85, leaving an upstanding sliver 88 between said cut slots. The sliver 88 passes upwardly into the lower end of the sub member 3 against the lower end of the remaining core of the stabilizer 2, which pushes inner control sleeve 22 upwardly into the tubular container 5 as the sub moves downwardly, until the sub 3 and the milling cutter 24, which continue to be guided outwardly by the stabilizer 2 and inclined surface 11 of the whipstock, to a position where the inner ends of the annular cutter blades 36 at the inner side of the milling cutter engage and cut through the lower end of the sliver 88 at the lower edge of the slots 86 and 87 of the window 85, until said lower end of the outer left portion of the stabilizer 2 is cut off from said stabilizer, and the lower end of said sliver is cut off from the casing by the cutter at said lower edge 89 of said window. The cutter 24, sub 3 and the rest of the tool including said cut-off portion of the stabilizer 2 continue to move outwardly and downwardly from the lower end 89 of the window 85 into the formation 90, which passes up through the cutter 24 and into the lower end of the tool in the form of a core, the upper end of which core engages the lower ends of said cut-off portion of the stabilizer 2 and the sliver 88 and pushes said cut-off portion of the stabilizer 2 and the sliver up into the tool.

I claim:

1. A directional window cutter for oil wells including a whipstock formed with an inclined guiding surface, a stabilizer slidably mounted on said whipstock and guided by said guiding surface, means preventing rotation of said whipstock, a sub member, a mandrel connected at its lower end to said stabilizer with its upper end extending into said sub member and said mandrel being inclined downwardly and outwardly of the center of the well for guiding said sub member downwardly and laterally away from the whipstock face, a tubular container connected to the upper end of said sub member, the upper end of said container being connected to the lower end of a drill pipe, a rotary annular cutter mounted on the lower end of said sub member through which rotary cutter the upper end of said mandrel extends, a frangible collar fitted in the upper end of said sub member provided with a left hand internal thread, a cutter head on the upper end of said mandrel, a stud upstanding from said cutter head provided with a thread for engaging said left hand internal thread in said frangible collar, means for rotating said sub member and rotary cutter in a right hand direction for causing said left hand threaded stud to withdraw from said left hand thread in said frangible collar and thereafter to cause said cutter head to cut away said frangible collar to enable said rotary annular cutter to cut a window in the wall of the well.

2. A directional window cutter for oil wells as claimed in claim 1 including a rotatable control sleeve rotatably mounted on the sub member for engaging one side of the well to prevent the rotary cutter from engaging and binding against said side of the well engaged by said control sleeve.

3. A directional window cutter for oil wells including a tubular body member adapted to be connected with the lower end of a drill pipe, an outer control sleeve mounted for free rotation on the lower end of said body member, an annular milling cutter connected with and extending below the lower end of said body member, said milling cutter having an axial opening therethrough, a whipstock below said milling cutter, a stabilizer mounted on the inclined guiding surface of the whipstock, and a mandrel mounted and secured against rotation on said stabilizer, said mandrel extending through the axial opening in said cutter for guiding the latter.

References Cited in the file of this patent

UNITED STATES PATENTS

| | | |
|---|---|---|
| 1,502,427 | Getty | July 22, 1924 |
| 2,081,294 | Eastham | May 25, 1937 |
| 2,227,233 | Scott et al. | Dec. 31, 1940 |
| 2,555,462 | Beck | June 5, 1951 |
| 2,586,939 | Grable | Feb. 26, 1952 |
| 2,669,428 | Zublin | Feb. 14, 1954 |